United States Patent [19]
Davis

[11] Patent Number: 6,055,115
[45] Date of Patent: Apr. 25, 2000

[54] MAGNIFYING MAP VIEWER

[76] Inventor: Carl Davis, 3814 Mt. Blackburn Ave., San Diego, Calif. 92111

[21] Appl. No.: 09/186,412

[22] Filed: Nov. 5, 1998

[51] Int. Cl.$^7$ .................................................. G02B 27/02
[52] U.S. Cl. ............................... 359/800; 40/365; 40/642
[58] Field of Search .................................... 359/790, 806, 359/802, 803

[56] References Cited

U.S. PATENT DOCUMENTS

| | | | |
|---|---|---|---|
| 3,805,429 | 4/1974 | Thompson | 40/86 |
| 4,881,334 | 11/1989 | Brown | 40/365 |
| 4,966,318 | 10/1990 | Dutka | 224/42.46 |
| 5,313,730 | 5/1994 | Tiller | 40/642 |
| 5,604,640 | 2/1997 | Zipf et al. | 359/803 |

*Primary Examiner*—Scott J. Sugarman
*Assistant Examiner*—Timothy Thompson

[57] ABSTRACT

A magnifying map viewer for magnifying a map surface so that it may be easily read by a user. The magnifying map viewer includes a case having top and bottom panels and a perimeter side wall between the top and bottom panels of the case. The top and bottom panels of the case define a space therebetween designed for positioning a map therein. The perimeter side wall of the case has an side opening into the space between the top and bottom panels for extending a map into the space between the top and bottom panels. The top panel of the case has a top opening into the space between the top and bottom panels for permitting a user to view a surface of a map in the space between the top and bottom panels. The lower ends of a plurality of support posts are coupled to the top panel. A magnifying window has a magnifying lens and an outer frame extending around the magnifying lens of the magnifying window. The outer frame of the magnifying window has a plurality of apertures therethrough through which the upper ends the support posts are inserted so that the magnifying lens of the magnifying window is positioned above the top opening of the top panel.

9 Claims, 2 Drawing Sheets

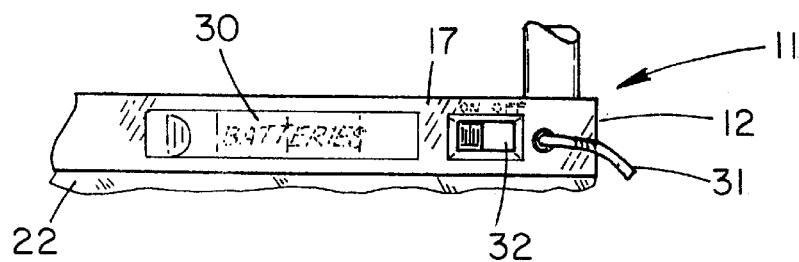
FIG. 3
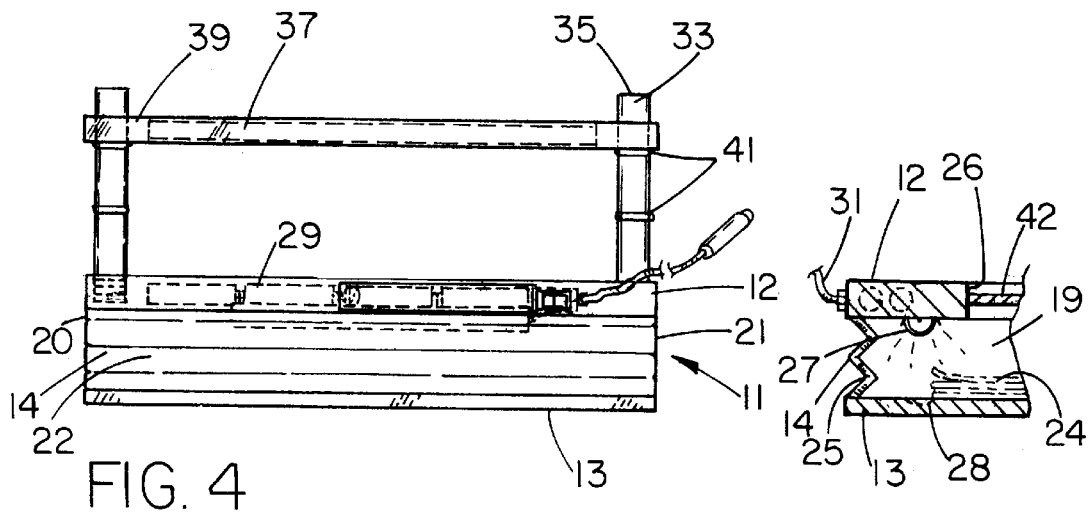
FIG. 4
FIG. 5
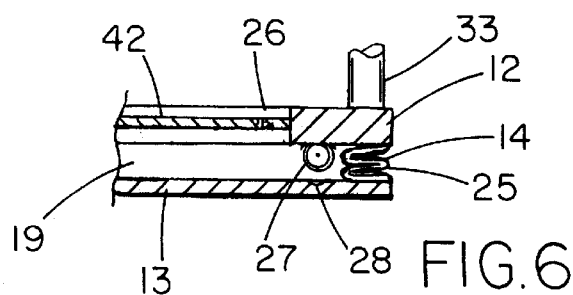
FIG. 6

MAGNIFYING MAP VIEWER

BACKGROUND OF THE INVENTION

1. Field of the Invention

The present invention relates to map holders and viewers and more particularly pertains to a new magnifying map viewer for magnifying a map surface so that it may be easily read by a user.

2. Description of the Prior Art

The use of map holders and viewers is known in the prior art. More specifically, map holders and viewers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,313,730 by Tiller; U.S. Pat. No. 5,183,193 by Brandell; U.S. Pat. No. 4,862,614 by Shettleroe; U.S. Pat. No. 4,457,585 by DuCorday; U.S. Pat. No. 4,379,618 by Tall; and U.S. Pat. No. Des. 318,298 by Oren which are each incorporated by reference.

While these devices fulfill their respective, particular objectives and requirements, the aforementioned patents do not disclose a new magnifying map viewer. The inventive device includes a case having top and bottom panels and a perimeter side wall between the top and bottom panels of the case. The top and bottom panels of the case define a space therebetween designed for positioning a map therein. The perimeter side wall of the case has an side opening into the space between the top and bottom panels for extending a map into the space between the top and bottom panels. The top panel of the case has a top opening into the space between the top and bottom panels for permitting a user to view a surface of a map in the space between the top and bottom panels. The lower ends of a plurality of support posts are coupled to the top panel. A magnifying window has a magnifying lens and an outer frame extending around the magnifying lens of the magnifying window. The outer frame of the magnifying window has a plurality of apertures therethrough through which the upper ends the support posts are inserted so that the magnifying lens of the magnifying window is positioned above the top opening of the top panel.

In these respects, the magnifying map viewer according to the present invention substantially departs from the conventional concepts and designs of the prior art, and in so doing provides an apparatus primarily developed for the purpose of magnifying a map surface so that it may be easily read by a user.

SUMMARY OF THE INVENTION

In view of the foregoing disadvantages inherent in the known types of map holders and viewers now present in the prior art, the present invention provides a new magnifying map viewer construction wherein the same can be utilized for magnifying a map surface so that it may be easily read by a user.

The general purpose of the present invention, which will be described subsequently in greater detail, is to provide a new magnifying map viewer apparatus and method which has many of the advantages of the map holders and viewers mentioned heretofore and many novel features that result in a new magnifying map viewer which is not anticipated, rendered obvious, suggested, or even implied by any of the prior art map holders and viewers, either alone or in any combination thereof.

To attain this, the present invention generally comprises a case having top and bottom panels and a perimeter side wall between the top and bottom panels of the case. The top and bottom panels of the case define a space therebetween designed for positioning a map therein. The perimeter side wall of the case has an side opening into the space between the top and bottom panels for extending a map into the space between the top and bottom panels. The top panel of the case has a top opening into the space between the top and bottom panels for permitting a user to view a surface of a map in the space between the top and bottom panels. The lower ends of a plurality of support posts are coupled to the top panel. A magnifying window has a magnifying lens and an outer frame extending around the magnifying lens of the magnifying window. The outer frame of the magnifying window has a plurality of apertures therethrough through which the upper ends the support posts are inserted so that the magnifying lens of the magnifying window is positioned above the top opening of the top panel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new magnifying map viewer apparatus and method which has many of the advantages of the map holders and viewers mentioned heretofore and many novel features that result in a new magnifying map viewer which is not anticipated, rendered obvious, suggested, or even implied by any of the prior art map holders and viewers, either alone or in any combination thereof.

It is another object of the present invention to provide a new magnifying map viewer which may be easily and efficiently manufactured and marketed.

It is a further object of the present invention to provide a new magnifying map viewer which is of a durable and reliable construction.

An even further object of the present invention is to provide a new magnifying map viewer which is susceptible of a low cost of manufacture with regard to both materials and labor, and which accordingly is then susceptible of low prices of sale to the consuming public, thereby making such magnifying map viewer economically available to the buying public.

Still yet another object of the present invention is to provide a new magnifying map viewer which provides in the apparatuses and methods of the prior art some of the advantages thereof, while simultaneously overcoming some of the disadvantages normally associated therewith.

Still another object of the present invention is to provide a new magnifying map viewer for magnifying a map surface so that it may be easily read by a user.

Yet another object of the present invention is to provide a new magnifying map viewer which includes a case having top and bottom panels and a perimeter side wall between the top and bottom panels of the case. The top and bottom panels of the case define a space therebetween designed for positioning a map therein. The perimeter side wall of the case has an side opening into the space between the top and bottom panels for extending a map into the space between the top and bottom panels. The top panel of the case has a top opening into the space between the top and bottom panels for permitting a user to view a surface of a map in the space between the top and bottom panels. The lower ends of a plurality of support posts are coupled to the top panel. A magnifying window has a magnifying lens and an outer frame extending around the magnifying lens of the magnifying window. The outer frame of the magnifying window has a plurality of apertures therethrough through which the upper ends the support posts are inserted so that the magnifying lens of the magnifying window is positioned above the top opening of the top panel.

Still yet another object of the present invention is to provide a new magnifying map viewer that is collapsible for convenient storage when not in use.

Even still another object of the present invention is to provide a new magnifying map viewer that has a light source for illuminating the surface of the map being viewed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic partial side view of the present invention.

FIG. 4 is a schematic side view of the present invention.

FIG. 5 is a schematic partial side view looking into the space through the side opening with the perimeter side wall in a partially expanded position.

FIG. 6 is a schematic partial side view looking into the space through the side opening with the perimeter side wall in a compressed or collapsed position.

DESCRIPTION OF THE PREFERRED EMBODIMENT

Figure 1:
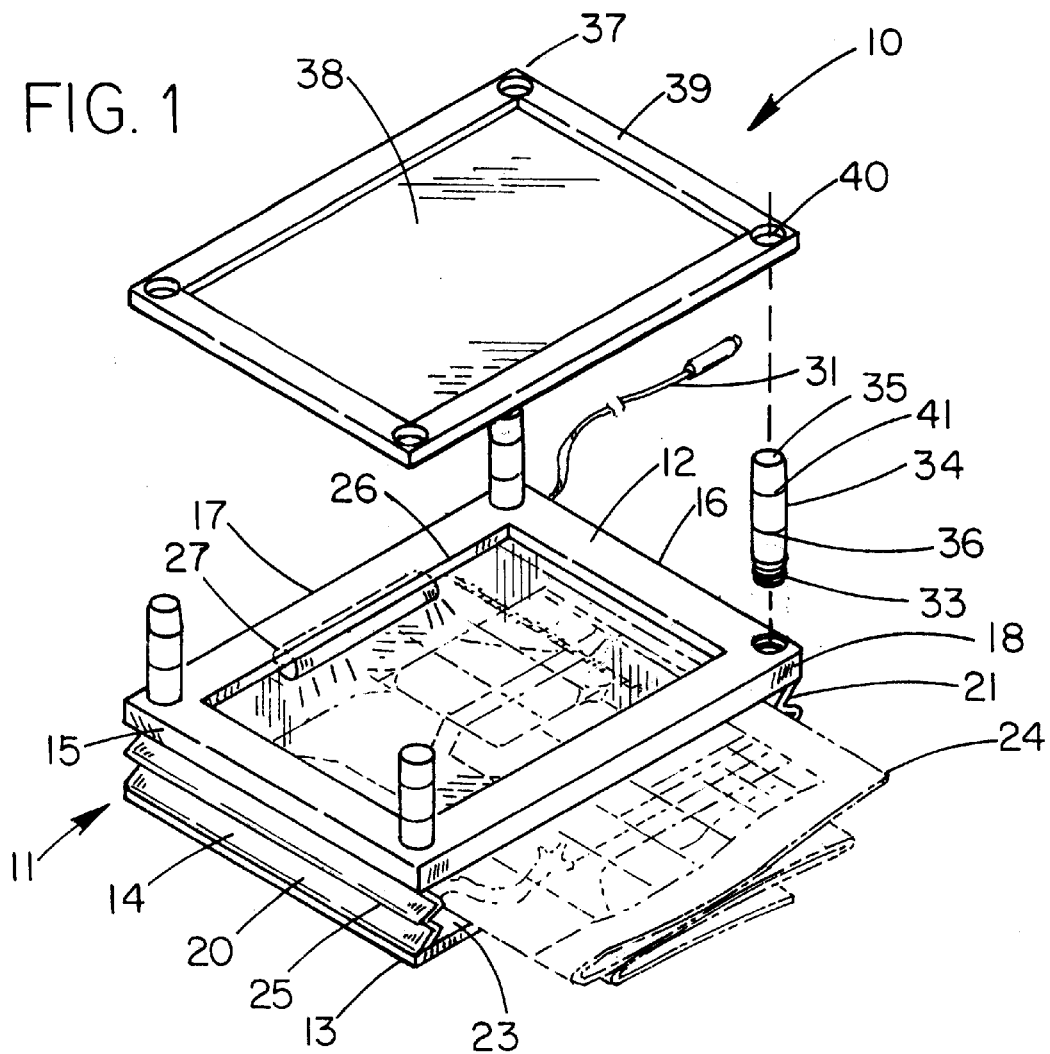
FIG. 1 is a schematic exploded perspective view of a new magnifying map viewer according to the present invention.
Figure 2:
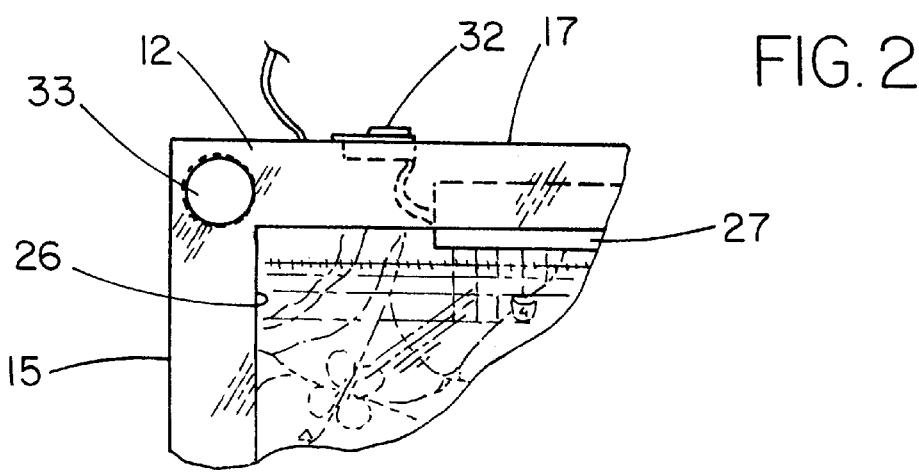
FIG. 2 is a schematic partial plan view of a corner of the top panel of the present invention.

With reference now to the drawings, and in particular to FIGS. 1 through 6 thereof, a new magnifying map viewer embodying the principles and concepts of the present invention and generally designated by the reference numeral 10 will be described.

As best illustrated in FIGS. 1 through 6, the magnifying map viewer 10 generally comprises a case 11 having top and bottom panels 12,13 and a perimeter side wall 14 between the top and bottom panels 12,13 of the case. The top and bottom panels 12,13 of the case define a space 19 therebetween designed for positioning a map 24 therein. The perimeter side wall 14 of the case has an side opening 23 into the space 19 between the top and bottom panels for extending a map 24 into the space 19 between the top and bottom panels. The top panel 12 of the case has a top opening 26 into the space 19 between the top and bottom panels for permitting a user to view a surface of a map 24 in the space 19 between the top and bottom panels. The lower ends 36 of a plurality of support posts 34 are coupled to the top panel 12. A magnifying window 37 has a magnifying lens 38 and an outer frame 39 extending around the magnifying lens 38 of the magnifying window. The outer frame 39 of the magnifying window has a plurality of apertures 40 therethrough through which the upper ends 35 the support posts are inserted so that the magnifying lens 38 of the magnifying window is positioned above the top opening 26 of the top panel.

In closer detail, the magnifying map viewer 10 comprises a case 11 having generally rectangular top and bottom panels 12,13 and a perimeter side wall 14 between the top and bottom panels 12,13 of the case. The top and bottom panels 12,13 each are generally planar and each have a pair of end edges 15,16, a pair of side edges 17,18 extending between the end edges 15,16 of the respective panel, and four corners. The top and bottom panels 12,13 of the case define a space 19 therebetween designed for positioning a map 24 therein. The perimeter side wall 14 of the case comprises a spaced apart pair of end walls 20,21 and a side wall 22 extending between the end walls 20,21 of the perimeter side wall. The perimeter side wall 14 of the case extends between the end edges 15,16 and one of side edges 17,18 of each of the top and bottom panels 12,13 such that the perimeter side wall 14 has an side opening 23 into the space 19 between the top and bottom panels. The side opening 23 of the perimeter side wall is positioned between one of the side edges of each of the top and bottom panels and has a width extending between the end edges of the top and bottom panels. As illustrated in FIG. 1, in use, the side opening 23 of the perimeter side wall is designed for extending a map 24 into the space 19 between the top and bottom panels.

The case 11 has a thickness defined between the top and bottom panels 12,13 of the case, a length defined between the pair of end walls 20,21 of the perimeter side wall, and a width defined between the side wall and the side opening 23 of the perimeter side wall. Preferably, the perimeter side wall 14 of the case is collapsible to reduce the thickness of the case 11. With particular reference to FIGS. 1, 5 and 6, in a preferred embodiment, the perimeter side wall 14 has a plurality of flexible accordion pleats 25 extending along the end walls 20,21 and the side wall 22 of the perimeter side wall to permit collapsing of the perimeter side wall 14. As best illustrated in FIG. 1, the flexible accordion pleats 25 each generally extend generally parallel to the planes of the top and bottom panels 12,13. Ideally, the perimeter side wall 14 of the case comprises a resiliently flexible plastic material so that the flexible accordion pleats 25 can be formed in a molding process.

The top panel 12 of the case has a top opening 26 into the space 19 between the top and bottom panels. The top opening 26 of the top panel preferably has a generally rectangular outer periphery. The top opening 26 of the top opening 26 is preferably centered on the top panel 12 such that the outer periphery of the top opening 26 is about equally spaced from the end edges and side edges of the top panel. In use, the top opening 26 of the top panel is designed for permitting a user to view a surface of a map 24 in the space 19 between the top and bottom panels. Optionally, a transparent window 42 may be provided to substantially close the top opening 26.

With reference to FIGS. 5 and 6, the case 11 has a light source 27 in the space 19 between the top and bottom panels. The light source 27 is preferably mounted to the top panel 12 of the case adjacent the outer periphery of the top opening 26 of the top panel. The light source 27 preferably has a generally cylindrical configuration has a longitudinal axis extending generally parallel to the side wall 22 of the perimeter side wall. In use, the light source 27 is designed for illuminating the space 19 between the top and bottom panels to aid visibility of a map 24 in the space 19 between the top and bottom panels. Ideally, the bottom panel 13 of the case 11 has depression 28 facing into the space 19 between the top and bottom panels. The depression 28 has a generally circular transverse cross section, the depression 28 of the bottom panel 13 is positioned beneath the light source 27 such that the depression 28 of the bottom panel 13 receives a portion of the light source 27 when the perimeter side wall 14 is collapsed.

A power source is electrically connected to the light source 27. Preferably, the power source comprises a battery power source 29 provided in the case 11 which is accessible through an access panel 30 in the perimeter side wall. Even more preferably, the power source further comprises a flexible electric power cord 31 outwardly extended from the case 11. The electric power cord 31 has a plug designed for electrically connecting to a socket of an electrical power supply. Also in the preferred embodiment, a switch 32 is electrically connected to the light source 27 for selectively activating and deactivating the light source 27. The switch 32 has an actuator is mounted to the perimeter side wall 14 of the case.

The top panel 12 has a plurality of threaded bores 33 therein. Each of the threaded bores 33 of the top panel is positioned adjacent an associated corner of the top panel 12. A plurality of removable support posts 34 are provided each being generally cylindrical and having opposite upper and lower ends 35,36. The lower end 36 of each of the support posts 34 is threadably inserted into an associated threaded bore of the top panel 12 such that the support posts 34 upwardly extend generally perpendicularly from the top panel 12 of the case.

As illustrated in FIG. 1, the generally rectangular magnifying window 37 has a generally rectangular transparent magnifying lens 38 and a generally rectangular outer frame 39 extending around the perimeter of the magnifying lens 38 of the magnifying window. The outer frame 39 of the magnifying window has four corners and a plurality of generally circular apertures 40 therethrough. Each of the apertures 40 of the outer frame is positioned adjacent an associated corner of the outer frame 39. The upper end 35 of each of the support posts is inserted into an associated aperture of the outer frame 39 of the magnifying window such that the support post 34 support the magnifying window 37 above the top panel 12 of the case with the magnifying lens 38 of the magnifying window positioned above the top opening 26 of the top panel. In use, the magnifying window 37 is designed for magnifying the images on the surface of a map 24 in the space 19 between the top and bottom panels viewed through the magnifying window 37.

Preferably, each of the support posts 34 has a plurality of spaced apart resiliently compressible annular protrusions 41 therearound. The annular protrusions 41 of each support post are preferably spaced apart at generally equal intervals between the upper and lower ends 35,36 of the respective support post. The outer frame 39 of the magnifying window is rested on an annular support of each of the support posts to support the magnifying window 37 above the top panel 12. In use, the annular protrusions 41 are squeezable through their associated apertures 40 of the outer frame of the magnifying window to permit adjustable positioning of the magnifying window 37 above the top panel 12 to control the amount of magnifying of the images on the surface of the map 24 in the space 19 between the top and bottom panels. When the magnifying window 37 is slid down the support posts 34 to rest of the top panel 12, the magnifying lens 38 substantially covers the top opening 26.

In an ideal illustrative embodiment, the thickness of the case 11 fully expanded is between about 3 and 4 inches, the length of the case 11 is about 12 inches, and the width of the case 11 is about 9 inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A magnifying map viewer, comprising:
   a case having top and bottom panels and a perimeter side wall between said top and bottom panels of said case;
   said top and bottom panels of said case defining a space therebetween adapted for positioning a map therein;
   said perimeter side wall of said case having an side opening into said space between said top and bottom panels;
   said side opening of said perimeter side wall being adapted for extending a map into said space between said top and bottom panels;

said top panel of said case having a top opening into said space between said top and bottom panels;

said top opening of said top panel being adapted for permitting a user to view a surface of a map in said space between said top and bottom panels;

a plurality of support posts each having opposite upper and lower ends, said lower end of each of said support posts being coupled to said top panel;

a magnifying window having a magnifying lens and an outer frame extending around said magnifying lens of said magnifying window;

said outer frame of said magnifying window having a plurality of apertures therethrough;

said upper end of each of said support posts being inserted into an associated aperture of said outer frame of said magnifying window such that said magnifying lens of said magnifying window is positioned above said top opening of said top panel; and wherein said perimeter side wall of said case is collapsible to reduce said thickness of said case, said case has a light source in said space between said top and bottom panels, said light source being adapted for illuminating said space between said top and bottom panels to aid visibility of a map in said space between said top and bottom panels, wherein said light source is mounted to said top panel of said case, and wherein said bottom panel of said case has depression facing into said space between said top and bottom panels, said depression of said bottom panel being positioned beneath said light source such that said depression of said bottom panel receives a portion of said light source when said perimeter side wall is collapsed.

2. The magnifying map viewer of claim 1, wherein said perimeter side wall has a plurality of flexible accordion pleats, said flexible accordion pleats each generally extending generally parallel to said top and bottom panels.

3. The magnifying map viewer of claim 1, wherein said case has a light source in said space between said top and bottom panels, said light source being adapted for illuminating said space between said top and bottom panels to aid visibility of a map in said space between said top and bottom panels.

4. The magnifying map viewer of claim 3, wherein said light source is mounted to said top panel of said case.

5. The magnifying map viewer of claim 1, further comprising a power source being electrically connected to said light source, wherein said power source comprises a battery power source provided in said case.

6. The magnifying map viewer of claim 1, further comprising a switch being electrically connected to said light source, said switch being mounted to said perimeter side wall of said case.

7. The magnifying map viewer of claim 1, wherein said top panel has a plurality of threaded bores therein, said lower end of each of said support posts being threadably inserted into an associated threaded bore of said top panel such that said support posts are coupled to said top panel.

8. The magnifying map viewer of claim 1, wherein each of said support posts having a plurality of spaced apart resiliently compressible annular protrusions therearound, said outer frame of said magnifying window being rested on an annular support of each of said support posts to support said magnifying window above said top panel.

9. A magnifying map viewer, comprising:

a case having generally rectangular top and bottom panels and a perimeter side wall between said top and bottom panels of said case;

said top and bottom panels each being generally planar and having a pair of end edges, a pair of side edges extending between said end edges of the respective panel, and four corners;

said top and bottom panels of said case defining a space therebetween adapted for positioning a map therein;

said perimeter side wall of said case comprising a spaced apart pair of end walls and a side wall extending between said end walls of said perimeter side wall;

said perimeter side wall of said case having an side opening into said space between said top and bottom panels;

said side opening of said perimeter side wall being positioned between one of said side edges of each of said top and bottom panels and having a width extending between said end edges of said top and bottom panels;

said side opening of said perimeter side wall being adapted for extending a map into said space between said top and bottom panels;

said case having a thickness defined between said top and bottom panels of said case, a length defined between said pair of end walls of said perimeter side wall, and a width defined between said side wall and said side opening of said perimeter side wall;

said perimeter side wall of said case being collapsible to reduce said thickness of said case, said perimeter side wall having a plurality of flexible accordion pleats extending along said end walls and said side wall of said perimeter side wall to permit collapsing of said perimeter side wall, said flexible accordion pleats each generally extending generally parallel to said top and bottom panels;

said top panel of said case having a top opening into said space between said top and bottom panels, said top opening of said top panel having a generally rectangular outer periphery;

said top opening of said top opening being centered on said top panel such that said outer periphery of said top opening is about equally spaced from said end edges and side edges of said top panel;

said top opening of said top panel being adapted for permitting a user to view a surface of a map in said space between said top and bottom panels;

said case having a light source in said space between said top and bottom panels, said light source being mounted to said top panel of said case adjacent said outer periphery of said top opening of said top panel;

said light source having a generally cylindrical configuration having a longitudinal axis extending generally parallel to said side wall of said perimeter side wall;

said light source being adapted for illuminating said space between said top and bottom panels to aid visibility of a map in said space between said top and bottom panels;

said bottom panel of said case having depression facing into said space between said top and bottom panels, said depression having a generally circular transverse cross section, said depression of said bottom panel being positioned beneath said light source such that said depression of said bottom panel receives a portion of said light source when said perimeter side wall is collapsed;

a power source being electrically connected to said light source, wherein said power source comprises a battery power source provided in said case, wherein said power source further comprises a flexible electric power cord outwardly extended from said case, said electric power cord having a plug adapted for electrically connecting to a socket of an electrical power supply;

a switch being electrically connected to said light source, said switch being mounted to said perimeter side wall of said case;

said top panel having a plurality of threaded bores therein, each of said threaded bores of said top panel being positioned adjacent an associated corner of said top panel;

a plurality of support posts each being generally cylindrical and having opposite upper and lower ends, said lower end of each of said support posts being threadably inserted into an associated threaded bore of said top panel such that said support posts upwardly extend generally perpendicularly from said top panel of said case;

a generally rectangular magnifying window having a generally rectangular magnifying lens and a generally rectangular outer frame extending around said magnifying lens of said magnifying window;

said outer frame of said magnifying window having four corners and a plurality of generally circular apertures therethrough, each of said apertures of said outer frame being positioned adjacent an associated corner of said outer frame;

said upper end of each of said support posts being inserted into an associated aperture of said outer frame of said magnifying window such that said support post support said magnifying window above said top panel of said case, said magnifying lens of said magnifying window being positioned above said top opening of said top panel, said magnifying window being adapted for magnifying the images on the surface of a map in said space between said top and bottom panels viewed through said magnifying window;

each of said support posts having a plurality of spaced apart resiliently compressible annular protrusions therearound, said annular protrusions of each support post being spaced apart at generally equal intervals between said upper and lower ends of the respective support post; and said outer frame of said magnifying window being rested on an annular support of each of said support posts to support said magnifying window above said top panel, said annular protrusions being squeezable through the associated apertures of said outer frame of said magnifying window to permit adjustable positioning of said magnifying window above said top panel.

\* \* \* \* \*